US012706092B2

(12) United States Patent
Wilkinson et al.

(10) Patent No.: US 12,706,092 B2
(45) Date of Patent: Aug. 11, 2026

(54) TRANSCRIPTION GENERATION

(71) Applicant: Sorenson IP Holdings, LLC, Salt Lake City, UT (US)

(72) Inventors: Andrew Wilkinson, Pittsburgh, PA (US); Ryan Price, East Hanover, NJ (US); Mason Acree, American Fork, UT (US)

(73) Assignee: Sorenson IP Holdings, LLC, Salt Lake City, UT (US)

(*) Notice: Subject to any disclaimer, the term of this patent is extended or adjusted under 35 U.S.C. 154(b) by 118 days.

(21) Appl. No.: 18/646,725

(22) Filed: Apr. 25, 2024

(65) Prior Publication Data

US 2025/0336396 A1 Oct. 30, 2025

(51) Int. Cl.

*G10L 15/197* (2013.01)
*G10L 15/01* (2013.01)
*G10L 15/32* (2013.01)

(52) U.S. Cl.

CPC ............ *G10L 15/197* (2013.01); *G10L 15/01* (2013.01); *G10L 15/32* (2013.01)

(58) Field of Classification Search

CPC ........ G10L 15/197; G10L 15/01; G10L 15/32
USPC .......................................................... 704/235
See application file for complete search history.

(56) References Cited

U.S. PATENT DOCUMENTS 10,573,312 B1 * 2/2020 Thomson ................ G10L 15/22
11,410,658 B1 * 8/2022 Ma ........................ G10L 15/063
11,610,588 B1 * 3/2023 Grichnik ................ G06Q 10/40
12,148,417 B1 * 11/2024 Cardella ................ G10L 15/18
12,242,945 B1 * 3/2025 Everest .................. G06N 20/00
12,271,360 B1 * 4/2025 Nguyen ................ G10L 15/183
12,579,975 B2 * 3/2026 Huang .................. G10L 15/197
2005/0099406 A1 * 5/2005 Pettiross ............. G06F 3/04883 345/179
2007/0208570 A1 * 9/2007 Bhardwaj ........... G06F 16/3331 704/270.1
2010/0063815 A1 * 3/2010 Cloran ................. G06Q 10/103 704/235
2013/0085753 A1 * 4/2013 Bringert .................. G10L 15/32 704/E15.039
2016/0117299 A1 * 4/2016 Hynes ................... H04L 51/063 715/256
2022/0059077 A1 * 2/2022 Thomson .............. G10L 15/065
2022/0103683 A1 * 3/2022 Engelke ............ H04M 3/42391
2022/0293108 A1 * 9/2022 Kaufman ................ G10L 15/22
(Continued)

*Primary Examiner* — Thuykhanh Le
(74) *Attorney, Agent, or Firm* — Maschoff Brennan

(57) ABSTRACT

A method of transcript generation may include obtaining, from a device, audio data of a communication session between the device and another device. The method may also include directing the audio data to an automatic speech recognition system configured to generate transcript data that includes a transcription of the audio data. The method may further include providing the transcript data from the automatic speech recognition system to a large language model for the large language model to correct errors in the transcript data. Additionally, the method may include in response to providing the transcript data to the large language model, obtaining, from the large language model, correction data that includes correction of errors in the transcript data and directing, to the device, data based on the correction data.

20 Claims, 6 Drawing Sheets

(56) References Cited

U.S. PATENT DOCUMENTS

2023/0085433 A1* 3/2023 Can ........................ G10L 15/10
704/235
2023/0096821 A1* 3/2023 Huang ................. G10L 15/197
704/235
2023/0245654 A1* 8/2023 Shrivastava ........ G10L 15/1822
704/243
2023/0267926 A1* 8/2023 Padfield ................ G10L 15/187
704/235
2023/0305680 A1* 9/2023 Liu ....................... H04L 12/281
2023/0326460 A1* 10/2023 Sikora ................ G10L 15/1822
704/235
2023/0335126 A1* 10/2023 Huang .................... G10L 15/16
2023/0350549 A1* 11/2023 Gottstein .............. G06F 3/0484
2024/0113905 A1* 4/2024 Maury ..................... H04N 7/15
2024/0127822 A1* 4/2024 Engelke .................. G10L 15/26
2024/0194188 A1* 6/2024 Weisz .................... G10L 15/22
2024/0347064 A1* 10/2024 Li .......................... G06N 3/045
2024/0403697 A1* 12/2024 Nordfors ............. G06F 16/3329
2025/0029612 A1* 1/2025 Xu .......................... G06F 40/20
2025/0078829 A1* 3/2025 Nguyen .................. G10L 15/32
2025/0078842 A1* 3/2025 Park ........................ G10L 17/06
2025/0157473 A1* 5/2025 Pathak .................... G10L 15/26
2025/0193259 A1* 6/2025 Dasher ................ H04L 65/1089
2025/0209138 A1* 6/2025 Chengalvala ........ G06N 3/0985
2025/0218430 A1* 7/2025 Rank ...................... G06N 3/044
2025/0266036 A1* 8/2025 Kosek .................. A61B 5/4803
2025/0272540 A1* 8/2025 Yakobi ................. G06N 3/0455
2025/0285622 A1* 9/2025 Kylänpää ................ G10L 13/08
2025/0299668 A1* 9/2025 Canberk ............. B60R 16/0373
2025/0308516 A1* 10/2025 Xu ........................ G06F 40/166
2025/0378286 A1* 12/2025 Wang ...................... G06F 40/58

* cited by examiner

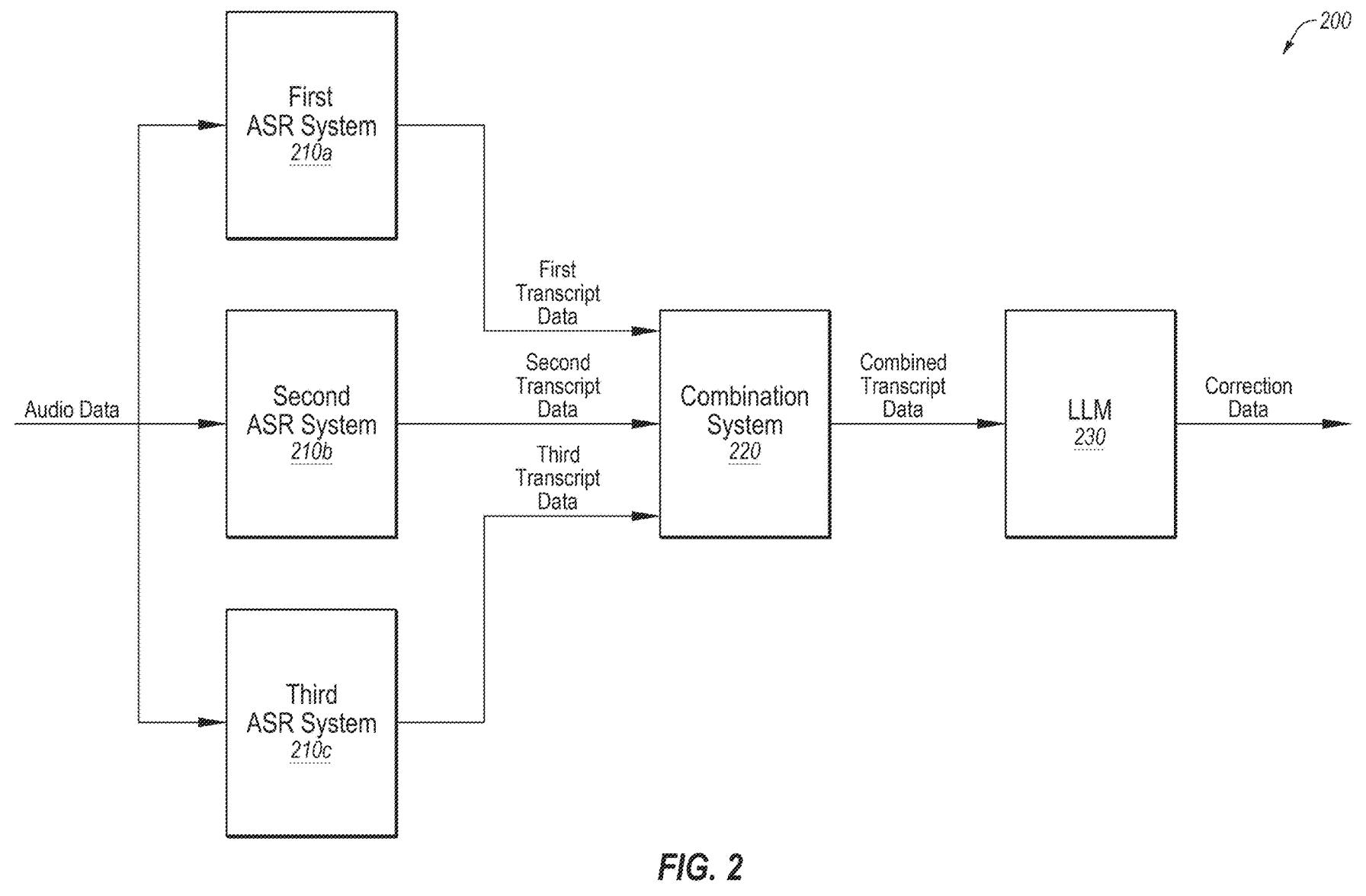

200

Audio Data

First ASR System 210a

Second ASR System 210b

Third ASR System 210c

First Transcript Data

Second Transcript Data

Third Transcript Data

Combination System 220

Combined Transcript Data

LLM 230

Correction Data

FIG. 2

TRANSCRIPTION GENERATION

FIELD

The embodiments discussed herein are related to transcription generation.

BACKGROUND

Audio communications may be performed using different types of devices. In some instances, people that are hard-of-hearing or deaf may need assistance to participate in the audio communications. In these instances, transcriptions of the audio may be provided to the hard-of-hearing or deaf. To provide the transcriptions to a hard-of-hearing or deaf person, a particular device or application running on a mobile device or computer may be used to display text transcriptions of the audio being received by the hard of hearing or deaf person.

The subject matter claimed herein is not limited to embodiments that solve any disadvantages or that operate only in environments such as those described above. Rather, this background is only provided to illustrate one example technology area where some embodiments described herein may be practiced.

SUMMARY

A method of transcript generation may include obtaining, from a device, audio data of a communication session between the device and another device. The method may also include directing the audio data to an automatic speech recognition system configured to generate transcript data that includes a transcription of the audio data. The method may further include providing the transcript data from the automatic speech recognition system to a large language model for the large language model to correct errors in the transcript data. Additionally, the method may include in response to providing the transcript data to the large language model, obtaining, from the large language model, correction data that includes correction of errors in the transcript data and directing, to the device, data based on the correction data.

BRIEF DESCRIPTION OF THE DRAWINGS

Example embodiments will be described and explained with additional specificity and detail through the use of the accompanying drawings in which:

FIG. 2 illustrates an example process flow for transcription generation;

DESCRIPTION OF EMBODIMENTS

In some circumstances, a person may be presented with transcriptions of audio. The audio may be stored audio or may be real-time audio. For example, during a phone call between the person and another person, the person may receive transcriptions of real-time audio of the phone call. In these and other circumstances, the transcriptions may be presented in real-time or substantially real-time to help to maintain a close relationship between the transcriptions and the audio.

Generally, to generate real transcriptions, automatic speech recognition (ASR) technology may be used. Current ASR technology may include systems that use acoustic models and language models to generate the transcriptions. However, these systems may not generate transcriptions with one hundred percent accuracy. As a result, errors may exist in the transcriptions. Additionally, the systems may output a transcription score with the transcriptions. The transcription scores may indicate how well words in the transcript data match words in the audio data.

Some embodiments in this disclosure relate to systems and methods that may be used to help to increase the accuracy of transcriptions from ASR systems. For example, in some embodiments, transcriptions from one or more ASR systems may be provided to a large language model (LLM) system. The LLM system may be prompted to determine one or more errors in the transcriptions. The LLM system may output correction data based on the prompt. The correction data may be used to provide a transcription with improved accuracy or may be provided as the transcription with improved accuracy.

Figure 1:
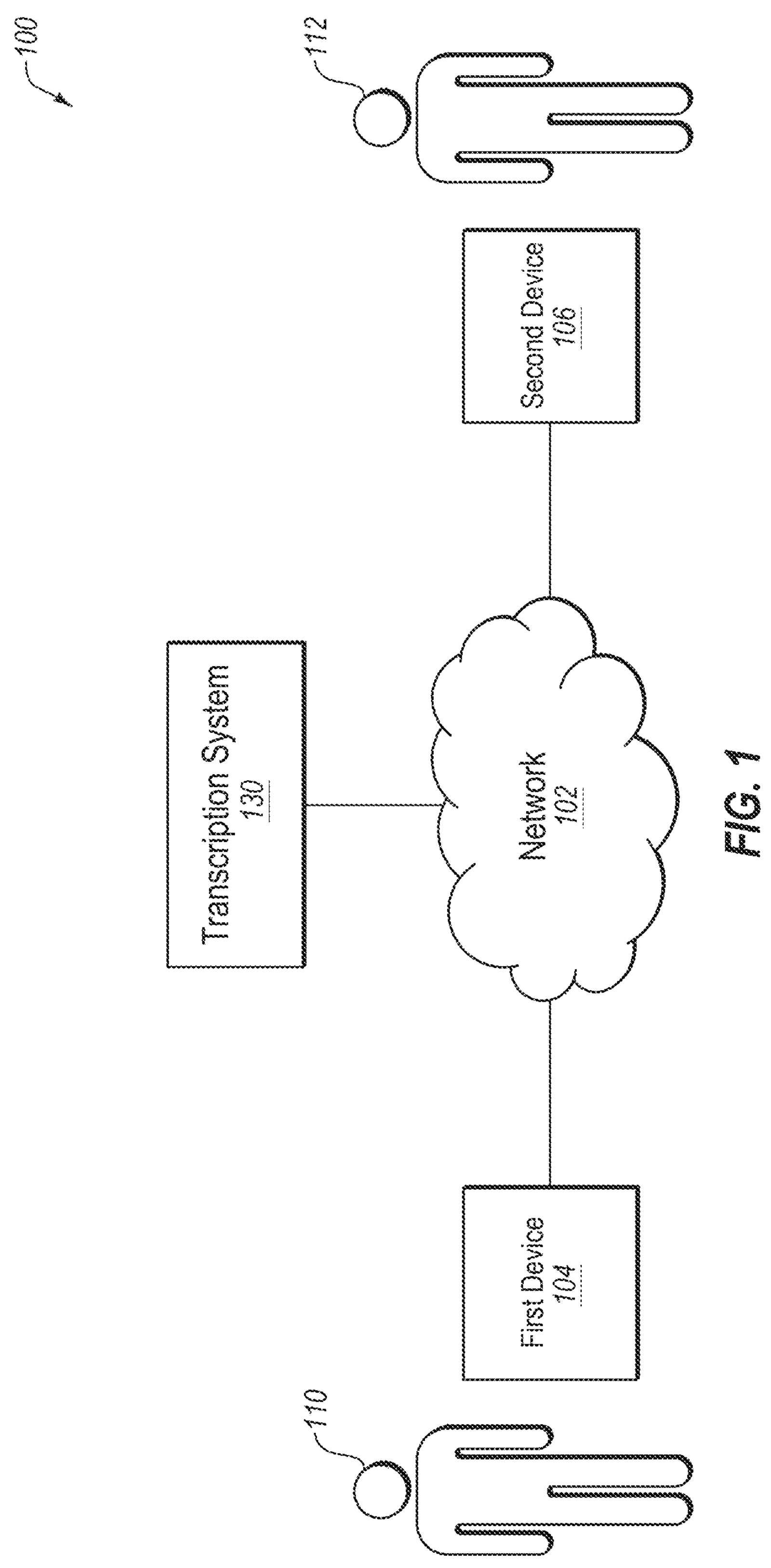
FIG. 1 illustrates an example environment for transcription generation.

Turning to the figures, FIG. 1 illustrates an example environment 100 for transcription generation. The environment 100 may be arranged in accordance with at least one embodiment described in the present disclosure. The environment 100 may include a network 102, a first device 104, a second device 106, and a transcription system 130.

The network 102 may be configured to communicatively couple the first device 104, the second device 106, and the transcription system 130. In some embodiments, the network 102 may be any network or configuration of networks configured to send and receive communications between systems and devices. In some embodiments, the network 102 may include a wired network, an optical network, and/or a wireless network, and may have numerous different configurations, including multiple different types of networks, network connections, and protocols to communicatively couple devices and systems in the environment 100. In some embodiments, the network 102 may also be coupled to or may include portions of a telecommunications network, including telephone lines, for sending data in a variety of different communication protocols, such as a plain old telephone system (POTS).

Each of the first device 104 and the second device 106 may include or be any electronic or digital computing device. For example, the first device 104 may include a desktop computer, a laptop computer, a smartphone, a mobile phone, a tablet computer, a telephone, a phone console, a caption device, a captioning telephone, or any other computing device that may be used for communication between a first user 110 of the first device 104 and a second user 112 of the second device 106. The second device 106 may include a desktop computer, a laptop computer, a smartphone, a mobile phone, a tablet computer, a telephone, a phone console, a caption device, a captioning telephone, or any other computing device that may be used for communication between the first user 110 of the first device 104 and the second user 112 of second device 106.

In some embodiments, each of the first device 104 and the second device 106 may include memory and at least one processor, which are configured to perform operations as described in this disclosure, among other operations. In some embodiments, each of the first device 104 and the second device 106 may include computer-readable instructions that are configured to be executed by each of the first device 104 and the second device 106 to perform operations described in this disclosure.

In some embodiments, each of the first device 104 and the second device 106 may be configured to obtain audio. As used in this disclosure, the term audio or audio signal may be used generically to refer to sounds that may include spoken words. Furthermore, the term "audio" or "audio signal" may be used generically to include audio in any format, such as a digital format, an analog format, or a propagating wave format. In these and other embodiments, one or both of the first device 104 and the second device 106 may be configured to provide obtained audio to the transcription system 130.

As an example of obtaining audio, the first device 104 may be configured to obtain first audio from the first user 110. For example, the first device 104 may obtain the first audio from a microphone of the first device 104 or from another device that is communicatively coupled to the first device 104.

The second device 106 may also be configured to obtain second audio from the second user 112. In some embodiments, the second device 106 may obtain the second audio from a microphone of the second device 106 or from another device communicatively coupled to the second device 106.

In some embodiments, each of the first device 104 and the second device 106 may be configured to establish communication sessions with other devices. For example, each of the first device 104 and the second device 106 may be configured to establish an outgoing communication session, such as a telephone call, voice over internet protocol (VOIP) call, video call, or conference call, among other types of outgoing communication sessions, with another device over a telephone line or network.

In some embodiments, each of the first device 104 and the second device 106 may be configured to obtain audio during a communication session. The audio may be part of an audio communication session, such as a telephone call, VOIP call, or conference call, among other audio communication sessions.

During a communication session between the first device 104 and the second device 106, the first device 104 may provide the first audio to the second device 106. Alternately or additionally, the second device 106 may provide the second audio to the first device 104. In these and other embodiments, one or both the first device 104 and the second device 106 may be configured to provide obtained audio from the communication session to the transcription system 130.

In some embodiments, the transcription system 130 may be configured to generate a transcription of the audio received from either one or both the first device 104 and the second device 106. The transcription system 130 may also provide the generated transcription of the audio to either one or both the first device 104 and the second device 106. Either one or both the first device 104 and the second device 106 may be configured to present the transcription received from the transcription system 130. For example, the first device 104 may be configured to display the received transcriptions on a display that is part of the first device 104 or that is communicatively coupled to the first device 104. With respect to FIG. 1, the disclosure may discuss obtaining information and presenting transcriptions to the first device 104 and/or the first user 110 for easy in explanation. However, any description of obtaining information and presenting transcriptions may apply to both the first device 104 and the second device 106 unless otherwise specified.

In some embodiments, the transcription system 130 may include any configuration of one or more systems or hardware, such as processors, servers, and data storages, which are networked together and configured to perform one or more tasks.

In some embodiments, the transcription system 130 may be configured to generate a transcription of audio using a combination of different technologies and/or methods. For example, the transcription system 130 may be configured to generate a transcription of audio using automatic speech recognition (ASR) technology. ASR technology may include the use of one or more models to generate transcript data that may include a transcription of the audio. For example, the ASR technology may use a feature model, a transform model, an acoustic model, a language model, among other types of models. The feature model may be configured to assist in extracting features of the audio that may be used to recognize words in the audio. The types of features may include LSFs (line spectral frequencies), cepstral features, and MFCCs (Mel Scale Cepstral Coefficients), among other features. The transform model may be configured to assist in transforming extracted features into a format that may provide better accuracy, less processing, or other advantages. The transform model may be configured to assist in compensating for variations in individual voices such as pitch, gender, accent, age, and other individual voice characteristics. Alternately or additionally, the transform model may be configured to assist in compensating for variations in noise, distortion, filtering, and other channel characteristics. In some embodiments, the transform model may be speaker-independent, meaning that the transform model may be trained on and used for all speakers. Alternately or additionally, the transform model may be speaker-dependent, meaning that each speaker or small group of speakers has an associated transform model which is trained on and used for that speaker or small group of speakers.

In some embodiments, the acoustic model may be used to determine a set of probabilities, such as phoneme probabilities using the formatted extracted features. The phoneme probabilities may indicate the probability that the audio sample described in the vector of features is a particular phoneme of speech. Alternately or additionally, the phoneme probabilities may include multiple phonemes of speech that may be described in the vector of features. In some embodiments, the language model may be a statistical language model or finite state grammar model and, in some configurations, a pronunciation model or lexicon. The language model may be configured to assist in determining a series of words, denoted as a hypothesis, for use in generating a transcription. In some embodiments, the language model may be configured to assist in outputting a structure in a rich format, representing multiple hypotheses or alternative transcriptions, such as a word confusion network (WCN), lattice (a connected graph showing possible word combinations and, in some cases, their associated probabilities), or n-best list (a list of hypotheses in descending order of likelihood, where "n" is the number of hypotheses).

In some embodiments, the multiple hypotheses may be analyzed, reevaluated, and/or reorder using the language model or a sub-model of the language model. For example, the language model may include two parts. A first part may be configured to generate the structure in the rich format, representing multiple hypotheses or alternative transcriptions and the second part may be configured to analyze the structure and generate transcript data that includes one or more words and/or phrases that are represented in the audio obtained by the ASR technology. In these and other embodiments, the second part of the language model may be a neural-net based language model such as a recurrent neural network language model. The language model may output the one or more words and/or phrases as transcript data.

In some embodiments, the ASR technology may be further configured to output a transcription score for each word, hypothesis, phrase, and/or final output generated by the ASR technology. In these and other embodiments, the transcript data may include a transcription, such as one or more words and/or phrases from the audio and the transcription score associated with the one or more words and/or phrases. Note that the one or more words and/or phrases may be hypothesis generated by the ASR technology. Thus, the one or more words and/or phrases included in the transcript data may not include a finalized transcription that may be generated by the ASR technology.

In some embodiments, the transcription score may be a confidence score generated by the ASR technology. The confidence score may indicate a probability that a word, hypothesis, phrase, and/or final output generated by the ASR technology is accurate and correctly represents the words in the audio obtained by the transcription system 130. Alternately or additionally, the transcription score may be an accuracy score of the transcription or some other metric that may convey how accurately the transcription system 130 generated the words and/or phrases from the words and/or phrases in the audio.

For example, the transcription score may include a log probability for each word, hypothesis, phrase, and/or final output generated by the ASR technology. In these and other embodiments, the language model of the ASR technology may be configured to generate the log probabilities for word, hypothesis, phrase, and/or final output generated by the ASR technology. Alternately or additionally, another language model may be configured to generate the log probabilities. For example, the ASR technology may include a language model that may output the one or more words and/or phrases as transcript data. The ASR technology may also be configured to generate a confidence score for the transcript data. In these and other embodiments, the transcription system 130 may further include another language model. The other language model may be configured to obtain the transcript data and determine a log probability for each word, hypothesis, phrase, and/or final output. In these and other embodiments, the log probabilities may be included in the transcription score of the transcript data.

In some embodiments, the transcription system 130 may use fully machine-based ASR systems that may operate without human intervention. Alternately or additionally, the transcription system 130 may be configured to generate transcript data using a revoicing transcription system. The revoicing transcription system may receive and broadcast audio to a human agent. The human agent may listen to the broadcast and speak the words from the broadcast. The words spoken by the human agent are captured to generate revoiced audio. The revoiced audio may be used by ASR technology to generate transcript data.

In some embodiments, the transcription system 130 may be configured to provide the transcript data generated by an ASR system using ASR technology to a large language model (LLM). In these and other embodiments, the transcription system 130 may provide the one or more words and/or phrases alone or the one or more words and/or phrases and the transcription scores of the one or more words and/or phrases. The transcription system 130 may provide the transcript data to an LLM system requesting the LLM to correct errors in the transcript data. In particular, the LLM may be configured to determine errors in the one or more words and/or phrases in the transcript data. The LLM may determine the errors based on grammatical constructs of the language of the transcript data, common language usage of the one or more words and/or phrases in the transcript data, among other constructs. In addition, the LLM may be configured to determine the errors using the transcription score for the one or more words and/or phrases in the transcript data. For example, the LLM may use the confidence scores of the one or more words and/or phrase to determine the errors. Alternately or additionally, the LLM may use the log probabilities of the one or more words and/or phrases to determine the errors. Alternately or additionally, the LLM may use confidence scores and the log probabilities of the one or more words and/or phrases to determine the errors. In some embodiments, the audio from the first device 104 and/or the second device 106 may not be provided to the LLM. Rather, the LLM may only obtain the transcript data from the ASR system and use the transcript data to generate the correction data. In these and other embodiments, the correction data may be an indication of the errors in the transcript data. For example, the correction data may describe the errors in the transcript data. For example, the correction data may indicate which of the words in the transcript data is incorrect. In these and other embodiments, the correction data may further include one or more words to replace one or more words that the correction data indicates is incorrect. Alternately or additionally, the correction data may include a corrected version of the transcript data. In these and other embodiments, the correction data may be a different version of the transcript data that includes the corrections but does not indicate the corrections. For example, the transcript data may include a phrase and the correction data may include the phrase with one word of the phrase corrected but not indicate which word was correct. For example, the transcript data may include "I saw a smelly fish" and the correction data may include "I saw a jelly fish." Alternately or additionally, the correction data may include the indication of the errors, the corrections, and the different version.

In some embodiments, the LLM may be an artificial neural network. For example, the LLM may be built using a decoder-only transformer-based architecture. In these and other embodiments, the LLM may be configured to be a prompted based LLM and may operate by taking input text and repeatedly predicting the next token or word based on the input text. In these and other embodiments, the LLM may obtain knowledge about language syntax, semantics, and ontology from a corpus used in training the LLM. For example, the LLM may be part of a LLM system, such as a OpenAI's GPT series of models, Microsoft Copilot, Google's PaLM GeminI, Meta's ILaMA family of open-source models, Anthropic's Claude models, and Mistral A"'s open source models, among other LLM systems. Alternately or additionally, the above LLM systems may be examples of the LLM implemented in the environment 100.

In some embodiments, the transcript data and one or more prompt instructions may be provided to the LLM. The LLM may generate the correction data using the transcript data according to the prompt instructions. The LLM may provide the correction data to the transcription system 130. The transcription system 130 may generate display data for providing to the first device 104 and/or the second device 106 using the correction data and/or the transcript data. For example, the display data may be the transcript data that is corrected using the correction data. Alternately or additionally, the display data may be the correction data. Alternately or additionally, the display data may be the transcript data. In these and other embodiments, the correction data may be used to revise the display data that may include one or more errors. For example, the transcript data may include incorrect characters or words, among other mistakes. In these and other embodiments, the transcription system 130 may generate revisions of these characters or words, among other mistakes of the display data using the correction data. For example, the transcription system 130 may compare the correction data to the display data provided to the first device 104 and provide revisions to the display data based on the differences.

In some embodiments, the transcription system 130 may provide revisions to the first device 104 and/or the second device 106 for presentation. For example, the transcription system 130 may send the display data to the first device 104 and after may send one or more revisions of the display data, which may be generated based on the correction data, to the first device 104 for presentation.

In some embodiments, the display data may be provided to the first device 104, the second device 106, or both the first device 104 and the second device 106 in real-time or substantially real-time. For example, the audio may be broadcast by the first device 104 and within a limited period, such as 0.5, 1, 3, 5, 10, or 15 seconds, a transcription of the speech of the audio may be presented by the first device 104. Thus, the transcription may not be provided all at once. Rather, the transcription may be presented on a rolling basis based on the speech in the audio broadcast by the first device 104, such as closed captioning provided on television in the United States.

As an example of operation of the environment 100, the first device 104 may obtain audio of a communication session from a second device 106. The first device 104 may provide the audio to the transcription system 130. The transcription system 130 may generate transcript data using an ASR system. The transcription system 130 may provide the transcript data to the first device 104 and to an LLM. The LLM may generate correction data based on the transcript data and provide the correction data to the transcription system 130. The transcription system 130 may generate a revision of the transcript data based on the correction data and may provide the revision to the first device 104. The first device 104 may present the revision.

Modifications, additions, or omissions may be made to the environment 100 without departing from the scope of the present disclosure. For example, in some embodiments, the environment 100 may include additional devices. In these and other embodiments, the additional devices may be configured to present transcriptions, present revisions, obtain user input, present audio, and/or capture audio, among other functions described with respect to the first device 104 and/or the second device 106. For example, the environment 100 may include multiple other devices in communication therebetween such that the communication session is a conference call. In these and other embodiments, a transcription of audio from all or some of the devices may be generated.

In some embodiments, the environment 100 may not include the transcription system 130. In these and other embodiments, the first device 104 and/or the second device 106 may perform one or more of the processes of the transcription system 130. For example, the second device 106 may provide audio to an ASR system, obtain the transcript data, provide the transcript data to an LLM system and display data the first device 104 based on the transcript data, obtain the correction data from the LLM system, and provide revisions to the transcript data to the first device 104.

In some embodiments, the transcription system 130 may include the ASR system and the LLM. Alternately or additionally, the ASR system and/or the LLM may be separate from devices that perform the process of the transcription system 130 as described in this disclosure. For example, the transcription system 130 may be a computing system that directs data to and obtains data from separate ASR and LLM systems. For example, a server may obtain audio, direct the audio to a separate ASR system over a first API call to the ASR system. The server may obtain the transcript data from the ASR system and direct the transcript data to the first device 104. The server may also direct the transcript data and a prompt to the LLM system over a second API call to the LLM system. The server may obtain the correction data from the LLM system, determine revisions based on the correction data and the transcript data, and direct the revisions to the first device 104.

In some embodiments, the environment 100 may not include the second device 106. In these and other embodiments, the environment 100 may include another system that may be configured to provide audio to the first device 104. In these and other embodiments, the first device 104 may not provide audio to the system. For example, the system may be a recording system that is streaming audio and/or video to the first device 104. In these and other embodiments, the audio may be streamed to the first device 104 and routed to the transcription system 130. Alternately or additionally, the system may provide the audio to the transcription system 130 and to the first device 104.

In some embodiments, the functionality performed by the first device 104 may be performed by multiple devices. For example, a communication device may handle communication protocols with the second device 106 for a communication session and provide audio to and receive audio from a user device during the communication session. In these and other embodiments, the user device may communicate with the transcription system 130 and present audio and transcriptions to a user. In some embodiments, the communication device and the user device may be wired or wirelessly coupled, such as by a wireless network. In these and other embodiments, the wireless network may be a short-range network, such as a Bluetooth® network. Alternately or additionally, the functionality of the first device 104 may be performed by three devices, a communication device, an audio presentation device, and a display device. In these and other embodiments, the communication device may handle communication protocols with the second device 106, the audio presentation device may present audio of the communication session, and the display device may correspond with the transcription system 130 and present transcriptions of the communication session. Other configurations of devices may also be used to perform the functionality of the first device 104.

FIG. 2 illustrates an example process flow 200 for transcription generation. The process flow 200 may be arranged in accordance with at least one embodiment described in the present disclosure. The process flow 200 may include processes performed by a first ASR system 210*a*, a second ASR system 210*b*, and a third ASR system 210*c*, referred to collectively as the ASR systems 210. The ASR systems 210 may be examples of the ASR system described in FIG. 1. The process flow 200 may include processes performed by a combination system 220 and an LLM 230. In some embodiments, the process flow 200 may be an example of a process flow performed by the transcription system 130.

The process flow 200 may commence with audio data being obtained. The audio data may be obtained from a device or system. The audio data may include spoken words. The audio data may be provided to the ASR systems 210. Each of the ASR systems 210 may have a different configuration. For example, each of the ASR systems 210 may include one or more different models. The ASR systems 210 may each be configured to generate transcript data. The transcript data may include a transcription and a transcription score. The transcription may include one or more words and/or phrases. The one or more words and/or phrases may be finalized output or hypothesis from the ASR system 210. The transcription score may include one or more of a confidence score, an accuracy score, a log probability, among other scores for each of the words and/or phrases in the transcription. In some embodiments, the first ASR system 210*a* may generate first transcript data, the second ASR system 210*b* may generate second transcript data, and the third ASR system 210*c* may generate third transcript data. The transcript data from the ASR systems 210 may be provided to the combination system 220.

In some embodiments, the combination system 220 may be configured to combine or fuse the transcript data from the ASR systems 210. The combination system 220 may combine the transcript data by selecting aspects of the transcript data to generate combined transcript data. As an example, the combination system 220 may be configured to utilize a voting algorithm that selects a word based on a voting process among the transcript data from the ASR systems 210. For example, the combination system 220 may align the transcript data from the ASR systems 210. For each word in the ASR systems 210, the combination system 220 may determine if there is consistency of a word between two or more of the ASR systems 210. In response to consistency between two or more of the ASR systems 210, the combination system 220 may select the consistent word to be used in the combined transcript data. In response to no consistency, the combination system 220 may look at other aspects of the transcript data to select a word from one of the first transcript data, the second transcript data, and the third transcript data. In these and other embodiments, the combination system 220 may use factors such as transcription score from the transcript data to select the word. Alternately or additionally, the combination system 220 may use other factors to select the word. Alternately or additionally, the combination system 220 may use other methods to combine the transcript data. The combination system 220 may provide the combined transcript data to the LLM 230.

The LLM 230 may be an example of the LLM described in FIG. 1. The LLM 230 may be configured to obtain the combined transcript data. The LLM 230 may be prompted to generate correction data based on the combined transcript data. In these and other embodiments, the combined transcript data may include a combined transcription and a transcription score. The transcription score may be one of the transcription scores and/or a mathematical combination of one or more of the transcription scores, such as a mean, median, weighted mean, or some other combination.

The prompts provided to the LLM 230 may be directions regarding how the LLM 230 may process the combined transcript data to generate the correction data. The prompts may provide a description of the task to be performed by the LLM 230. For example, the prompts may indicate a type of the audio data. For example, is the audio data from a conversation between two people, a type of the conversation, such as a discussion between friends, a discussion with a customer service representative, a discussion between work colleagues, a lecture, a podcast, a show, or from some other audio source. The prompt may further direct the LLM 230 to focus on guessing which words from the combined transcript data are likely incorrect and guessing a correct word. Alternately or additionally, the prompt may further include directions to the LLM 230 regarding how to handle particular terms in the combined transcript data. For example, names, technical terms, words, numbers, or other specific terminology may be maintained and not changed. Alternately or additionally, the prompt my further include directions to the LLM 230 regarding how to indicate an error in the combined transcript data, how to format the correction data, and/or other issues regarding the correction data, such as directing the LLM 230 to not add or delete large portions of the transcription. Alternately or additionally, the prompt may further include directions regarding how to handle words that are questionable but for which the LLM 230 is not sure how to proceed. Alternately or additionally, the prompt may include directions regarding how to handle repeating words or words that appear to be caused by a disfluency of the speaker of the words. An example of one or more prompts that may be provided to the LLM 230 is provided below:

The following text is a transcript of a podcast and may contain errors. Fix any you find. You must follow these guidelines:

1. You are focused on guessing which words are likely errors from a speech-recognition model, and guessing what they ought to have been recognized as.
2. If a sentence does not need corrections, leave it as it is; do not change it.
3. Do not add content like “The sentence is correct; there are no recognition errors.” or “(No changes)”. This is very important.
4. Do not delete large portions of text.
5. Do not add large portions of text.
6. If you are unsure about a word, leave it as it is.
7. If you are unsure about a word, and you think it is a name, leave it as it is.
8. If you are unsure about a word, and you think it is a technical term, leave it as it is.
9. If you are unsure about a word, and you think it is a foreign word, leave it as it is.
10. If you are unsure about a word, and you think it is a number, leave it as it is.
11. Do not put asterisks around your corrections, or otherwise draw attention to them.
12. In cases where it seems like the speaker is repeating words or otherwise uttering a disfluency, do not change the content.

Figure 3:
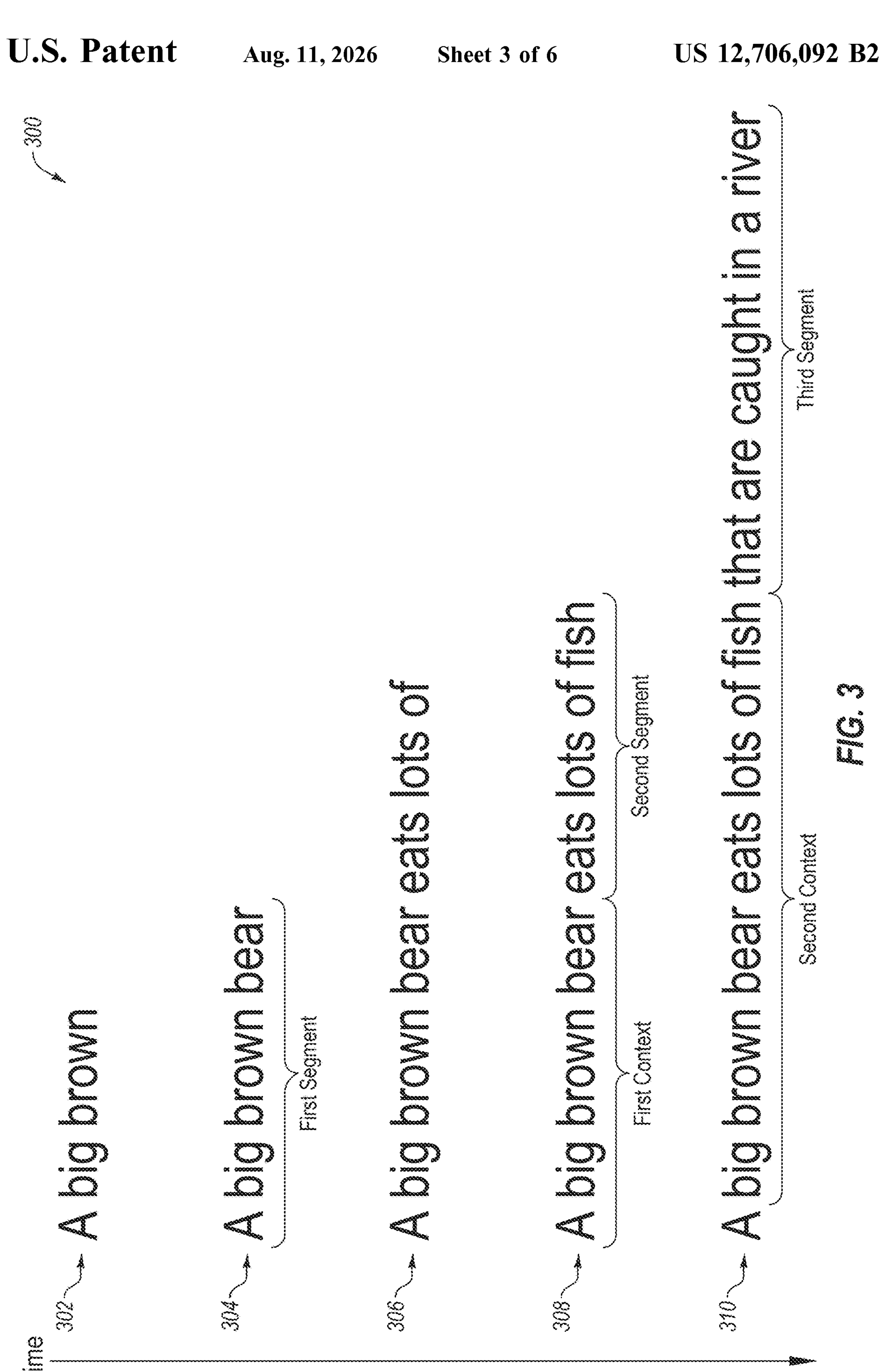
FIG. 3 illustrates an example diagram of transcription generation.

In some embodiments, the transcript data generated by the ASR systems 210 may be generated on a rolling basis. For example, one or more words may be generated for a phrase and output by the ASR systems 210. Additional words of the phrase may be generated thereafter and output by the ASR systems 210. FIG. 3 illustrates an example diagram 300 of transcription generation. The diagram 300 illustrates first transcript data 302, second transcript data 304, third transcript data 306, fourth transcript data 308, and fifth transcript data 310, where the first transcript data 302 is generated first, followed by the second transcript data 304, the third transcript data 306, the fourth transcript data 308, and the fifth transcript data 310. Note that a number of words increase for each transcript data as additional words from audio are transcribed and time passes. Thus, a transcription appearing later in time may include more words than a transcription earlier in time.

Returning to the discussion of FIG. 2, in some embodiments, a number of words provided to the LLM 230 may affect the ability of the LLM 230 to generate accurate correction data. For example, the LLM 230 may generate more accurate correction data when more words in a phrase are provided to the LLM 230. In short, the more context provided to the LLM 230, the more accurately the LLM 230 may generate the correction data. The number of words may have a limit, however, as the LLM 230 may have a limit on the number of words in a phrase that may be provided to the LLM 230 for generation of correction data. Alternately or additionally, the generation of transcriptions may be occurring in real-time or near real-time. As such, a delay in generation of the correction data may result in longer delays in providing the transcription to a user.

In some embodiments, to assist in balancing the delay and the accuracy of the LLM 230, the combined transcription data may be provided to a user device for presentation and the correction data from the LLM 230 may be used to revise any errors in the combined transcription data after presentation of the combined transcription data. Alternately or additionally, based on the configuration of the LLM 230, it may be determined that a threshold number of words provides adequate correction data. In these and other embodiments, the combination system 220 may buffer the combined transcript data and provide non-overlapping sequential segments of the combined transcript data. In these and other embodiments, a non-overlapping segment of the combined transcript data may be provided in response to the number of words in the non-overlapping segment of the combined transcript data satisfying the threshold number of words for the LLM 230.

For example, as illustrated in FIG. 3, the first transcript data 302 may include three words, which may not satisfy the threshold number of words for the LLM 230. In these and other embodiments, the combination system 220 may not provide the first transcript data 302 to the LLM 230. The second transcript data 304 may include four words, which may satisfy the threshold number of words for the LLM 230. In these and other embodiments, the combination system 220 may provide the second transcript data 304 to the LLM 230 as a first segment of the transcription. The LLM 230 may generate correction data based on the first segment. Further, as illustrated in FIG. 3, the third transcript data 306 may include three additional words "eats lots of." However, the additional words may not be enough for another segment of the combined transcript data to provide to the LLM 230. In these and other embodiments, the combination system 220 may continue to buffer the transcript data. The fourth transcript data 308 may include an additional word, such that the fourth transcript data 308 includes a second segment of the combined transcript data that may be provided to the LLM 230.

In some embodiments, the LLM 230 may be configured to obtain context data regarding the transcript data for which correction data may be generated. The context data may be words that proceed the words in the transcript data and may provide a context and/or additional information regarding the words in the transcript data. Including context data when providing the transcript data to the LLM 230 may allow the LLM 230 to generate more accurate correction data for the transcript data. Alternately or additionally, the inclusion of context data may allow the LLM 230 to generate more accurate correction data when the transcript data is less than the threshold number of words for the LLM 230.

For example, as illustrated in FIG. 3, the fourth transcript data 308 may include a second segment of the combined transcript data that may be provided to the LLM 230. An understanding of the second segment may be informed by the first segment. As such, the combination system 220 may provide the first segment as first context to the LLM 230. The first context may not be used by the LLM 230 to generate correction data. For example, the LLM 230 may not generate corrections for the context data. Rather, the first context may be used by the LLM 230 to inform how to generate corrections for the second segment. The LLM 230 may, for example, read the context data and use the contextual clues from the context data to determine if the words in the second segment are accurate. For example, knowing that it is a bear that "eats lots of fish" from the context data, informs the LLM 230 that the word "fish" is probably accurate. Whereas if the term "bear" was "hare," the LLM 230 may determine that the word "fish" is inaccurate based on the LLM 230 understanding that a hare is an herbivore and does not eat fish.

The fifth transcript data 310 illustrates a third segment of the combined transcript data that may be provided to the LLM 230. Note that the third segment does not overlap with the first segment and the second segment. The fifth transcript data 310 further illustrates second context that may be provided to the LLM 230. The second context may include the first context. As such, the context provided to the LLM 230 may overlap, e.g. the same words may be provided in multiple different contexts, as the LLM 230 may have different limits on a number of words that may be included in the context and additional context may result in increased accuracy in the correction data generated by the LLM 230. In these and other embodiments, the context provided to the LLM 230 may be based on a sliding window of a given size that slides as more words are generated for the combined transcript data.

In some embodiments, the combination system 220 may generate the context and the segments for providing to the LLM 230 using the combined transcript data. Alternately or additionally, another system not illustrated may be configurated to generate the context and the segments for providing to the LLM 230 using the combined transcript data. In these and other embodiments, the threshold size for the segments to provide to the LLM 230 may be based on parameters of the LLM 230, configuration of the LLM 230, if the transcript is occurring in real-time or non-real-time, feedback from a user, among other concepts.

In some embodiments, additional information may be provided to the LLM 230. For example, one or more tuning parameters may be determined for the LLM 230. The tuning parameters may affect how the LLM 230 may generate the correction data. The tuning parameters may be provided to the LLM 230 with the combined transcript data and one or more prompts. In some embodiments, the tuning parameters may be adjusted based on the type of audio being provided to the LLM 230 and/or a subject matter of the transcript data.

In some embodiments, the context may include additional data besides the previous words in the combined transcript data. For example, the context may include one or more words and/or phrases that may provide additional information about the combined transcript data. For example, the context may include an indication regarding a subject of the combined transcript data, data about a speaker of the audio data, and/or other information that may be provided in the context to the LLM 230 to assist the LLM 230 in generating the correction data.

Modifications, additions, or omissions may be made to the process flow 200 without departing from the scope of the present disclosure. For example, in some embodiments, the process flow 200 may allow a user to select the number and/or a type of the ASR systems 210.

As another example, the process flow 200 may not include the combination system 220. In these and other embodiments, the ASR systems 210 may be configured to each provide transcript data to the LLM 230. In these and other embodiments, the transcript data may include transcriptions from each of the ASR system 210 and transcription scores. Alternately or additionally, the transcript data may include transcriptions from each of the ASR system 210 and not include the transcription scores.

In some embodiments, the transcriptions may include one or more words and/or phrases. The one or more words and/or phrases may be a finalized outputs or hypotheses from the ASR systems 210. In these and other embodiments, the prompt provided to the LLM 230 may indicate whether the one or more words and/or phrases may be finalized outputs or hypotheses. For example, for a single section of audio, a single ASR system 210 may generate multiple hypotheses. In these and other embodiments, the multiple hypotheses may be provided to the LLM 230, and the prompt may indicate that each is a hypothesis generated by a single ASR system 210. Alternately or additionally, each of the ASR systems 210 may provide one or more hypotheses to the LLM 230. Alternately or additionally, one or more of the ASR systems 210 may provide one or more hypotheses to the LLM 230 and one or more of the ASR systems 210 may provide a finalized transcription to the LLM 230.

In some embodiments, the transcript data provided by one or more of the ASR systems 210 may include intermediate data generated by one or more models in the one or more ASR systems 210. For example, the intermediate data may include data such as an n-best list, WCN, and/or lattice. In these and other embodiments, the transcript data may include the one or more words and/or phrases and the n-best list, WCN, and/or lattice that may be used to generate the one or more words and/or phrases. Alternately or additionally, the intermediate data may be included in place of the one or more words and/or phrases generated by the ASR system 210. In these and other embodiments, the LLM 230 may generate the correction data based on the intermediate data.

In some embodiments, in response to the transcript data including an n-best list, a prompt provided to the LLM 230 may include information that the n-best list includes n number of alternative hypotheses from the ASR system for consideration by the LLM 230. In these and other embodiments, the prompt may indicate that the alternative hypotheses may be enumerated. In these and other embodiments, the enumeration may be a ranking of the alternative hypotheses by the ASR system.

In some embodiments, in response to the transcript data including a WCN, a prompt provided to the LLM 230 may include information indicating that the transcript data may include a textual representation of the WCN. In these and other embodiments, the prompt may indicate a separator token that may be used to demarcate each slot in the WCN. Alternately or additionally, the prompt may include a special token that may be used to indicate when a WCN slot does not include a word. In these and other embodiments, to create a textual representation of the WCN in the prompt, each slot in the WCN may include one or more words that may be enumerated. A last word in a slot may be followed by the separator token that indicates an end of the slot and the beginning of the next slot. In these and other embodiments, one or more phrases that may be generated using the WCN may also be provided as part of the prompt. For example, every phrase, some phrases, or phrases with a likelihood above a threshold may be included in the prompt. In these and other embodiments, the LLM 230 may use the information in generating the correction data.

In some embodiments, in response to the transcript data including a word lattice, a prompt provided to the LLM 230 may include information indicating that the transcript data may include a textual representation of the word lattice. The textual representation may include a tuple for each word in the lattice that may indicate a position of the word in the lattice. For example, the tuple may represent a structure containing a number of a source node and a number of a destination node for a word arc in the lattice.

In these and other embodiments, the textual representation of the word lattice may be generated by topologically sorting the word lattice so that each node in the lattice has a number. A tuple for a word in the lattice may include a source node and a destination node for the arc of the word. For example, if a word is on a word arc between a source node numbered 5 and a destination node numbered 10, the tuple for the word of (5,10) may indicate the source and destination node for the word.

In these and other embodiments, one or more phrases that may be generated using the word lattice may also be provided as part of the prompt. For example, every phrase, some phrases, or phrases with a likelihood above a threshold may be included in the prompt. In these and other embodiments, the LLM 230 may use the information in generating the correction data.

As another example, the process flow 200 may not include the combination system 220 and may include a single ASR system 210. In these and other embodiments, the transcript data from the single ASR system 210 may be provided to the LLM 230. In these and other embodiments, the transcript data may include intermediate data, one or more words and/or phrases, and/or the transcription score.

In some embodiments, the LLM 230 may be directed to generate a transcription using the transcript data from the single ASR system 210. In these and other embodiments, the transcription from the LLM 230 and the transcript data from the ASR system may be provided to a combination system, such as the combination system 220. In these and other embodiments, the combination system may combine the transcription from the LLM 230 and the transcript data from the ASR system to generate a transcription that may be used to correct the transcript data from the ASR system or provided to a user device for presentation of the transcription.

Alternately or additionally, the process flow 200 may include one or more additional ASR systems. The output of the LLM 230 may be combined with outputs of the one or more additional ASR systems using a system such as the combination system 220. In these and other embodiments, the combined transcription may be used to correct the transcript data from the ASR system or provided to a user device for presentation of the transcription.

In some embodiments, the process flow 200 may include providing the combined transcript data to a user device and to the LLM 230. In these and other embodiments, the correction data from the LLM 230 may be provided to another system that may compare the correction data and the combined transcript data to determine one or more revisions to make to the combined transcript data. In these and other embodiments, the revisions may be provided to the user device. In these and other embodiments, the user device may present the combined transcript data and then revise the presented combined transcript data based on the one or more revisions obtained by the user device.

As another example, the LLM 230 may be adjusted based on previous combined transcript data and/or correction data. For example, the previous combined transcript data and/or correction data may be provided to the LLM 230 to further tune the model within the LLM 230.

As another example, in some embodiments, the process flow 200 may include translation of the transcript data. For example, the audio data may be a first language. The audio data may be provided to the ASR systems 210. After generation of transcript data by the ASR systems 210, the process flow 200 may include translation of the transcript data from the first language to a second language, for example, from English to Spanish. To perform the translations, a translation algorithm may be used. The translation algorithm may be run using a processing system, for example, a processing system on one or more servers or other hardware device or system. The translated transcript data may be provided to the LLM 230 for generation of correction data. In these and other embodiments, the LLM 230 may generate correction data that relates to the translated transcript data. The correction data may be used to adjust the translated transcript data. For example, the corrected data may be used to change one or more words in the translated transcript data before or after the corrected translation data is provided to a user device for display to a user.

Alternately or additionally, the process flow 200 may include translation of the transcript data after the generation of correction data by the LLM 230. For example, the transcript data in the first language may be provided to the LLM 230. In these and other embodiments, the LLM 230 may generate correction data using the transcript data. The transcript data may be adjusted using the correction data. After adjustment of the transcript data, the transcript data may be translated from the first language to the second language.

Alternately or additionally, the process flow 200 may include translation of the transcript data by the LLM 230. In these and other embodiments, the transcript data from the ASR systems 210 may be provided to the LLM 230. The LLM 230 may be prompted to correct the transcript data and after correction of the transcript data to translate the corrected transcript data to a second language. For example, the LLM 230 may be prompted to first correct the transcript data and then to translate the corrected transcript data. Alternately or additionally, the LLM 230 may be prompted in a single prompt to correct and translate the transcript data from a first language to a second language. In these and other embodiments, the correction data output by the LLM 230 may be a corrected translation of the transcript data provided to the LLM 230. In these and other embodiments, the corrected translation of the transcript data may be provided to a user device.

Figure 4:
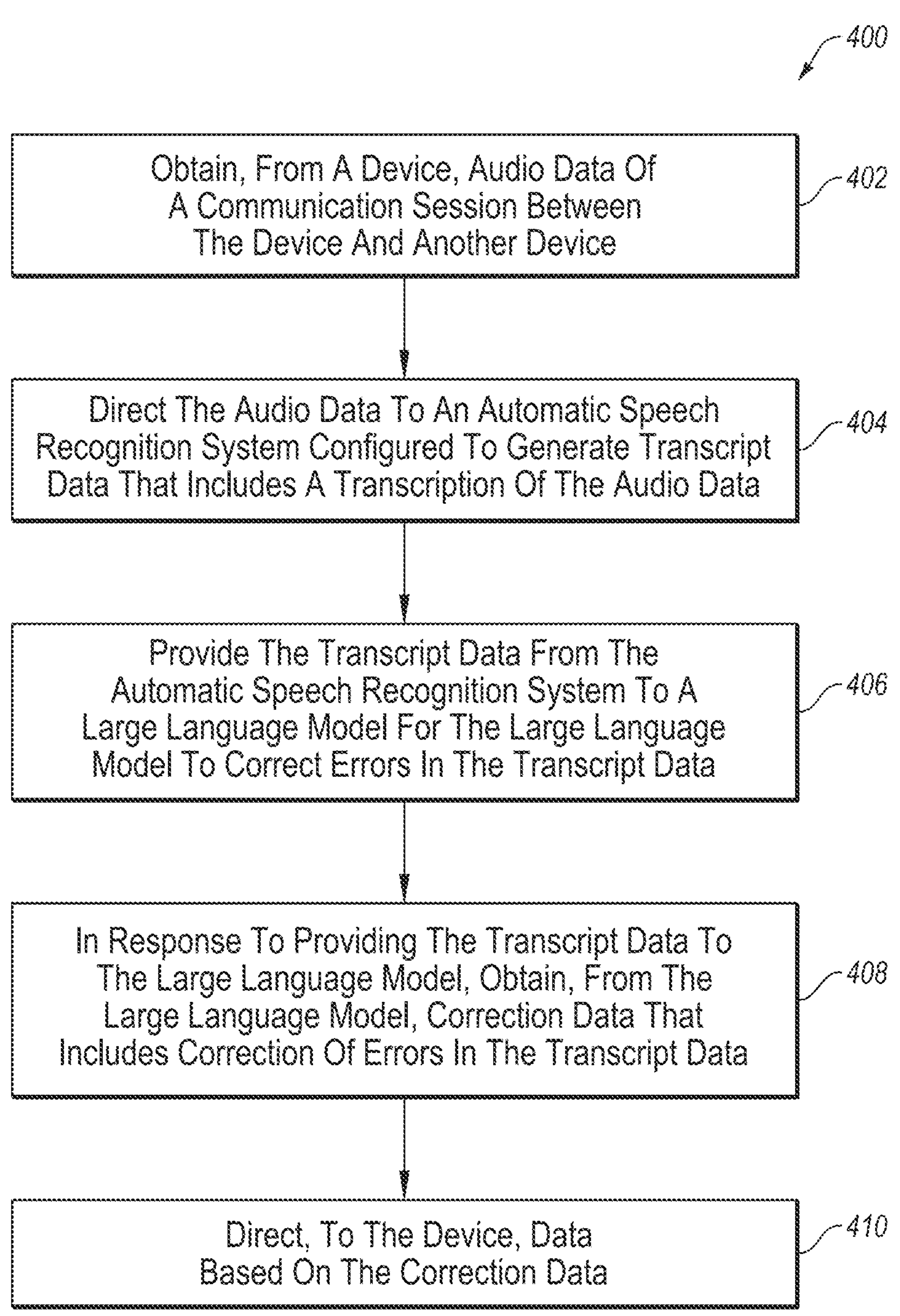
FIG. 4 illustrate a flowchart of an example method to generate transcriptions.

FIG. 4 illustrates a flowchart of an example method 400 to generate transcriptions. The method 400 may be arranged in accordance with at least one embodiment described in the present disclosure. One or more operations of the method 400 may be performed, in some embodiments, by a device or system, such as the transcription system 130 of FIG. 1 or another device or combination of devices. In these and other embodiments, the method 400 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 400 may begin at block 402, where audio data of a communication session between the device and another device may be obtained.

At block 404, the audio data may be directed to an automatic speech recognition system configured to generate transcript data that includes a transcription of the audio data. In some embodiments, the transcript data may include one or more words included in the transcription of the audio data and a transcription score generated by the automatic speech recognition system. In these and other embodiments, the transcription score may indicate how well words in the transcript data match words in the audio data.

At block 406, the transcript data from the automatic speech recognition system may be provided to a large language model for the large language model to correct errors in the transcript data. In some embodiments, the transcript data provided to the large language model may be a transcription of a portion of the audio data. In these and other embodiments, a number of words in the portion of the audio data may be based on one or more parameters of the large language model. In some embodiments, the transcript data may be derived from a first portion of the audio data of the communication session. In these and other embodiments, the method 400 may further include providing context to the large language model. The context may include transcript data derived from a second portion of the audio data that occurs before the first portion during the communication session.

In some embodiments, the automatic speech recognition system may include an acoustic model and the large language model may use a transformer architecture. In some embodiments, the large language model may be directed to use the transcription score to correct errors in the one or more words included in the transcription.

At block 408, in response to providing the transcript data to the large language model, correction data that includes correction of errors in the transcript data may be obtained from the large language model. At block 410, data may be directed to the device based on the correction data.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, the method 400 may further include directing the audio data to one or more secondary automatic speech recognition systems each configured to generate secondary transcript data that includes a separate transcription of the audio data. In these and other embodiments, the method may include providing the secondary transcript data from the secondary automatic speech recognition systems to the large language model along with the transcript data. In these and other embodiments, the large language model may generate the correction data using the secondary transcript data and the transcript data. In these and other embodiments, the transcript data and the secondary transcript data may include transcription scores generated by the automatic speech recognition system and the secondary automatic speech recognition systems. The transcription scores may indicate how well words in the transcript data match words in the audio data, and the large language model may be directed to use the transcription scores to generate the correction data.

As another example, the method 400 may include before obtaining the correction data from the large language model, providing the transcript data to the device. In these and other embodiments, the correction data may include revisions to transcript data previously obtained by the device.

As another example, the method 400 may include providing a prompt to the large language model. In these and other embodiments, the prompt may include directions for the large language model to process the transcript data.

As another example, the method 400 may include directing the audio data to one or more secondary automatic speech recognition systems each configured to generate secondary transcript data that includes a separate transcription of the audio data. The method 400 may also include combining the secondary transcript data and the transcript data. In these and other embodiments, the combined transcript data may be provided to the large language model for the large language model to correct errors in the combined transcript data. The transcript data may be provided to the large language model as part of the combined transcript data.

Figure 5:
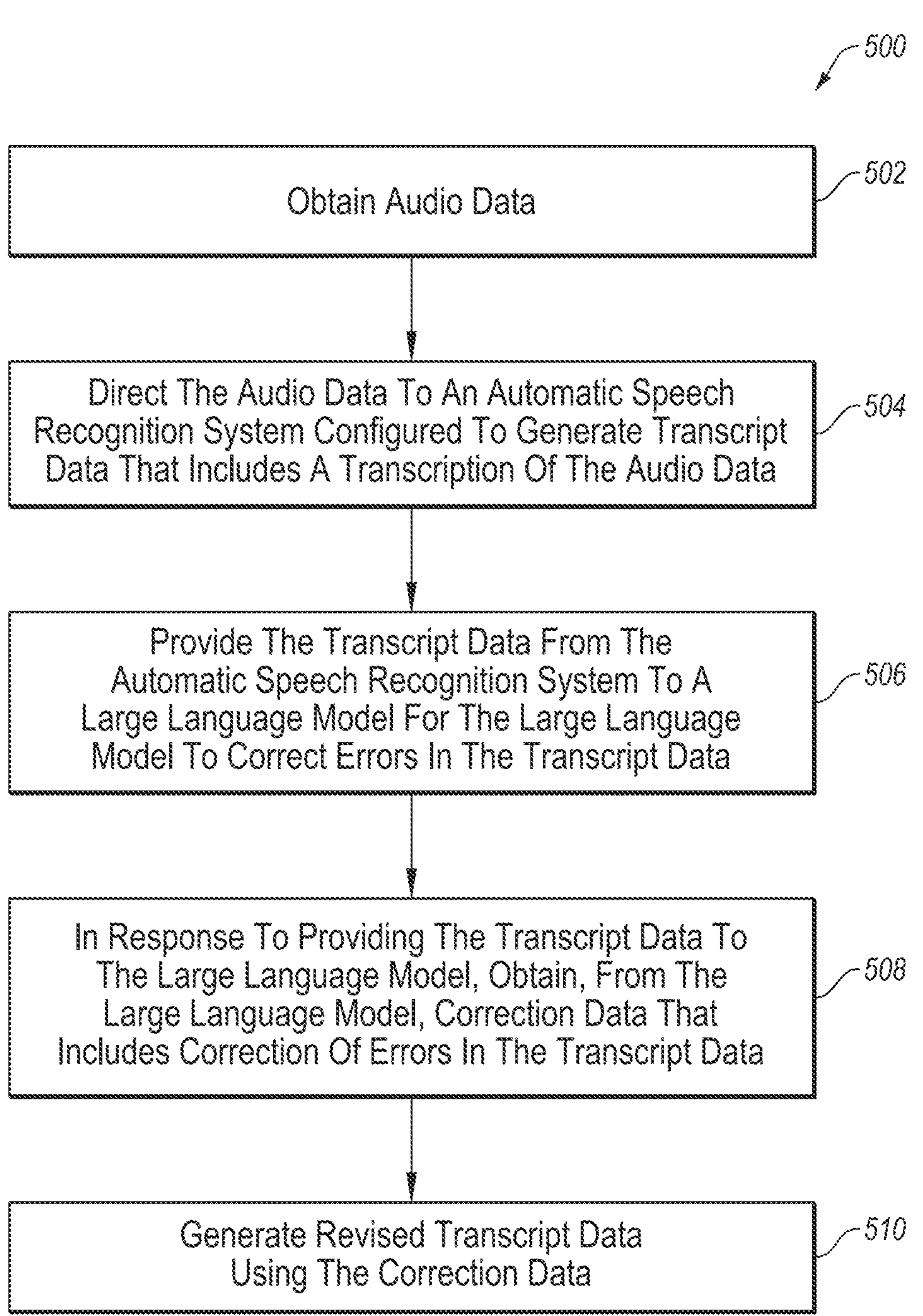
FIG. 5 illustrates a flowchart of another example method to generate transcriptions.

FIG. 5 illustrates a flowchart of an example method 500 to generate transcriptions. The method 500 may be arranged in accordance with at least one embodiment described in the present disclosure. One or more operations of the method 500 may be performed, in some embodiments, by a device or system, such as the transcription system 130 of FIG. 1 or another device or combination of devices. In these and other embodiments, the method 500 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 500 may begin at block 502, audio data may be obtained. At block 504, the audio data may be directed to an automatic speech recognition system configured to generate transcript data that includes a transcription of the audio data.

At block 506, the transcript data may be provided from the automatic speech recognition system to a large language model for the large language model to correct errors in the transcript.

At block 508, in response to providing the transcript data to the large language model, correction data that includes correction of errors in the transcript data may be obtained from the large language model. At block 510, revised transcript data may be generated using the correction data.

It is understood that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

Figure 6:
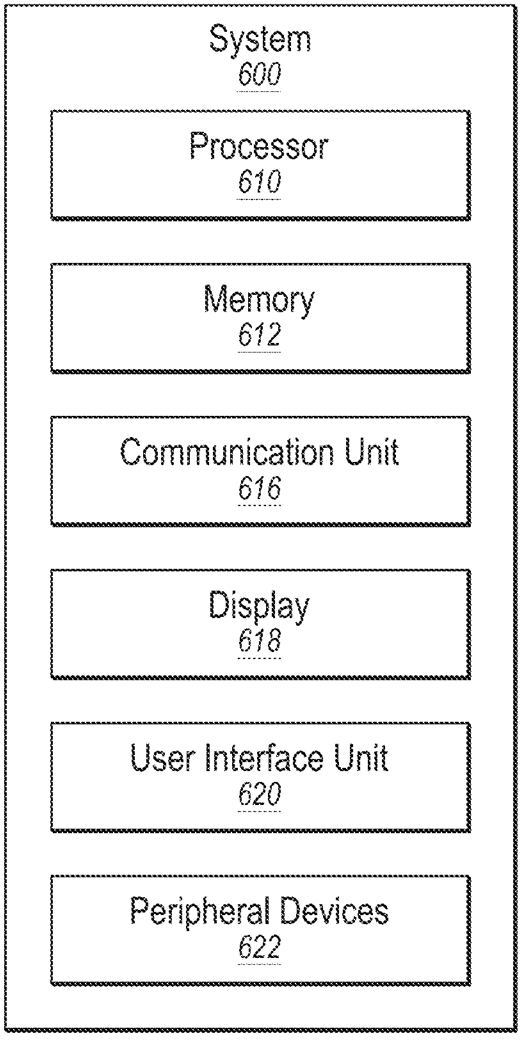
FIG. 6 illustrates an example system that may be used during transcription presentation.

FIG. 6 illustrates an example system 600 that may be used during transcription presentation. The system 600 may be arranged in accordance with at least one embodiment described in the present disclosure. The system 600 may include a processor 610, memory 612, a communication unit 616, a display 618, a user interface unit 620, and a peripheral device 622, which all may be communicatively coupled. In some embodiments, the system 600 may be part of any of the systems or devices described in this disclosure.

For example, the system 600 may be part of the transcription system 130 of FIG. 1 and may be configured to perform one or more of the tasks described above with respect to the transcription system 130. As another example, the system 600 may be part of any of the elements of FIG. 2 and may be configured to perform one or more of the tasks described above with respect to the process flow 200 of FIG. 2.

Generally, the processor 610 may include any suitable special-purpose or general-purpose computer, computing entity, or processing device including various computer hardware or software modules and may be configured to execute instructions stored on any applicable computer-readable storage media. For example, the processor 610 may include a microprocessor, a microcontroller, a parallel processor such as a graphics processing unit (GPU) or tensor processing unit (TPU), a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 6, it is understood that the processor 610 may include any number of processors distributed across any number of networks or physical locations that are configured to perform individually or collectively any number of operations described herein. In some embodiments, the processor 610 may interpret and/or execute program instructions and/or process data stored in the memory 612. In some embodiments, the processor 610 may execute the program instructions stored in the memory 612.

For example, in some embodiments, the processor 610 may execute program instructions stored in the memory 612 that are related to transcription presentation such that the system 600 may perform or direct the performance of the operations associated therewith as directed by the instructions. In these and other embodiments, the instructions may be used to perform one or more operations of the method 400 or the method 500 of FIGS. 4 and 5.

The memory 612 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 610.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 610 to perform a certain operation or group of operations as described in this disclosure. In these and other embodiments, the term "non-transitory" as explained in the present disclosure should be construed to exclude only those types of transitory media that were found to fall outside the scope of patentable subject matter in the Federal Circuit decision of In re *Nuijten,* 500 F.3d 1346 (Fed. Cir. 2007). Combinations of the above may also be included within the scope of computer-readable media.

The communication unit 616 may include any component, device, system, or combination thereof that is configured to transmit or receive information over a network. In some embodiments, the communication unit 616 may communicate with other devices at other locations, the same location, or even other components within the same system. For example, the communication unit 616 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, etc.), and/or the like. The communication unit 616 may permit data to be exchanged with a network and/or any other devices or systems described in the present disclosure. For example, when the system 600 is included in the transcription system 130 of FIG. 1, the communication unit 616 may allow the transcription system 130 to communicate with the first device 104.

The display 618 may be configured as one or more displays, like an LCD, LED, Braille terminal, or other type of display. The display 618 may be configured to present video, text captions, user interfaces, and other data as directed by the processor 610.

The user interface unit 620 may include any device to allow a user to interface with the system 600. For example, the user interface unit 620 may include a mouse, a track pad, a keyboard, buttons, camera, and/or a touchscreen, among other devices. The user interface unit 620 may receive input from a user and provide the input to the processor 610. In some embodiments, the user interface unit 620 and the display 618 may be combined.

The peripheral devices 622 may include one or more devices. For example, the peripheral devices may include a microphone, an imager, and/or a speaker, among other peripheral devices. In these and other embodiments, the microphone may be configured to capture audio. The imager may be configured to capture images. The images may be captured in a manner to produce video or image data. In some embodiments, the speaker may broadcast audio received by the system 600 or otherwise generated by the system 600.

Modifications, additions, or omissions may be made to the system 600 without departing from the scope of the present disclosure. For example, in some embodiments, the system 600 may include any number of other components that may not be explicitly illustrated or described. Further, depending on certain implementations, the system 600 may not include one or more of the components illustrated and described.

As indicated above, the embodiments described herein may include the use of a special purpose or general-purpose computer (e.g., the processor 610 of FIG. 6) including various computer hardware or software modules, as discussed in greater detail below. Further, as indicated above, embodiments described herein may be implemented using computer-readable media (e.g., the memory 612 of FIG. 6) for carrying or having computer-executable instructions or data structures stored thereon.

In some embodiments, the different components, modules, engines, and services described herein may be implemented as objects or processes that execute on a computing system (e.g., as separate threads). While some of the systems and methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

We claim:

1. A method of transcript generation, the method comprising:

obtaining, from a device, audio data of a communication session between the device and another device;

directing the audio data to an automatic speech recognition system configured to generate transcript data that includes a transcription of the audio data, the generating of the transcript data including:

extracting features from the audio data to generate a vector of features;

determining a set of probabilities using the vector of features;

determining one or more hypothesized words based on the set of probabilities; and outputting the transcription of the audio data based on the hypothesized words;

directing the audio data to one or more secondary automatic speech recognition systems each configured to generate secondary transcript data that includes a separate transcription of the audio data, the generating of the secondary transcript data including:

extracting features from the audio data to generate a vector of features;

determining a set of probabilities using the vector of features;

determining one or more hypothesized words based on the set of probabilities; and outputting the separate transcription of the audio data based on the one or more hypothesized words;

providing the transcript data from the automatic speech recognition system and the secondary transcript data from the secondary automatic speech recognition systems to a large language model for the large language model to correct errors in at least one of the transcript data or the secondary transcript data;

in response to providing the transcript data and the secondary transcript data to the large language model, obtaining correction data generated by the large language model using the transcript data and the secondary transcript data, wherein the correction data includes correction of errors in at least one of the transcript data or the secondary transcript data; and directing, to the device, data based on the correction data.

2. The method of claim 1, wherein the transcript data includes one or more words included in the transcription of the audio data and a transcription score generated by the automatic speech recognition system indicates how well words in the transcript data match words in the audio data, the large language model being directed to use the transcription score to correct errors in the one or more words included in the transcription.

3. The method of claim 1, wherein the transcript data and the secondary transcript data includes transcription scores generated by the automatic speech recognition system and the secondary automatic speech recognition systems, the transcription scores indicating how well words in the transcript data match words in the audio data, the large language model being directed to use the transcription scores to generate the correction data.

4. The method of claim 1, further comprising before obtaining the correction data from the large language model, providing the transcript data to the device, wherein the correction data includes revisions to transcript data previously obtained by the device.

5. The method of claim 1, further comprising providing a prompt to the large language model, the prompt including directions for the large language model to process the transcript data.

6. The method of claim 1, wherein the transcript data is derived from a first portion of the audio data of the communication session, the method further comprising providing context to the large language model, wherein the context includes transcript data derived from a second portion of the audio data that occurs before the first portion during the communication session.

7. The method of claim 1, wherein the automatic speech recognition system includes an acoustic model, and the large language model uses a transformer architecture.

8. The method of claim 1, further comprising:

combining the secondary transcript data and the transcript data, the combined transcript data being provided to the large language model for the large language model to correct errors in the combined transcript data, the transcript data provided to the large language model as part of the combined transcript data.

9. The method of claim 8, wherein the combined transcript data includes a combined transcription score generated based on transcription scores generated by the automatic speech recognition system and the secondary automatic speech recognition systems, the combined transcription score indicating how well words in the combined transcript data match words in the audio data, the large language model being directed to use the combined transcription score to generate the correction data.

10. The method of claim 1, wherein the transcript data provided to the large language model includes a word lattice, a word confusion network, or a n-best list used to generate the transcription of the audio data.

11. At least one non-transitory computer-readable media configured to store one or more instructions that, in response to being executed by a system, cause or direct the system to perform the method of claim 1.

12. A system comprising: one or more computer readable mediums including instructions;

one or more computing systems coupled to the one or more computer readable mediums and configured to execute the instructions to cause or direct the system to perform operations, the operations comprising:

obtaining, from a device, audio data of a communication session between the device and another device;

directing the audio data to an automatic speech recognition system configured to generate transcript data that includes a transcription of the audio data, the generating of the transcript data including:

extracting features from the audio data to generate a vector of features;

determining a set of probabilities using the vector of features;

determining one or more hypothesized words based on the set of probabilities; and outputting the transcription of the audio data based on the hypothesized words;

directing the audio data to one or more secondary automatic speech recognition systems each configured to generate secondary transcript data that includes a separate transcription of the audio data, the generating of the secondary transcript data including:

extracting features from the audio data to generate a vector of features;

determining a set of probabilities using the vector of features;

determining one or more hypothesized words based on the set of probabilities; and outputting the separate transcription of the audio data based on the one or more hypothesized words;

providing the transcript data from the automatic speech recognition system and the secondary transcript data from the secondary automatic speech recognition systems to a large language model for the large language model to correct errors in at least one of the transcript data or the secondary transcript data;

in response to providing the transcript data and the secondary transcript data to the large language model, obtaining correction data generated by the large language model using the transcript data and the secondary transcript data, wherein the correction data includes correction of errors in at least one of the transcript data or the secondary transcript data; and directing, to the device, data based on the correction data.

13. The system of claim 12, wherein the transcript data includes one or more words included in the transcription of the audio data and a transcription score generated by the automatic speech recognition system, the transcription scores indicating how well words in the transcript data match words in the audio data, the large language model being directed to use the transcription score to correct errors in the one or more words included in the transcription.

14. The system of claim 12, wherein the transcript data and the secondary transcript data includes transcription scores generated by the automatic speech recognition system and the secondary automatic speech recognition systems, the transcription scores indicating how well words in the transcript data match words in the audio data, the large language model being directed to use the transcription scores to generate the correction data.

15. The system of claim 12, wherein the transcript data is derived from a first portion of the audio data of the communication session, the operations further comprise providing context to the large language model, wherein the context includes transcript data derived from a second portion of the audio data that occurs before the first portion during the communication session.

16. The system of claim 12, wherein the automatic speech recognition system includes an acoustic model, and the large language model uses a transformer architecture.

17. The system of claim 12, wherein the operations further comprise:

combining the secondary transcript data and the transcript data, the combined transcript data being provided to the large language model for the large language model to correct errors in the combined transcript data, the transcript data provided to the large language model as part of the combined transcript data.

18. The system of claim 17, wherein the combined transcript data includes a combined transcription score generated based on transcription scores generated by the automatic speech recognition system and the secondary automatic speech recognition systems, the combined transcription score indicating how well words in the combined transcript data match words in the audio data, the large language model being directed to use the combined transcription score to generate the correction data.

19. The system of claim 12, wherein the transcript data provided to the large language model is a transcription of a portion of the audio data, a number of words in the portion of the audio data based on one or more parameters of the large language model.

20. A method of transcript generation, the method comprising:

obtaining audio data;

directing the audio data to an automatic speech recognition system configured to generate transcript data that includes a transcription of the audio data, the generating of the transcript data including:

extracting features from the audio data to generate a vector of features;

determining a set of probabilities using the vector of features;

determining one or more hypothesized words based on the set of probabilities; and outputting the transcription of the audio data based on the hypothesized words;

directing the audio data to one or more secondary automatic speech recognition systems each configured to generate secondary transcript data that includes a separate transcription of the audio data, the generating of the secondary transcript data including:

extracting features from the audio data to generate a vector of features;

determining a set of probabilities using the vector of features;

determining one or more hypothesized words based on the set of probabilities; and outputting the separate transcription of the audio data based on the one or more hypothesized words;

providing the transcript data from the automatic speech recognition system and the secondary transcript data from the secondary automatic speech recognition systems to a large language model for the large language model to correct errors in at least one of the transcript data or the secondary transcript data;

in response to providing the transcript data and the secondary transcript data to the large language model, obtaining, correction data generated by the large language model using the transcript data and the secondary transcript data, wherein the correction data includes correction of errors in at least one of the transcript data or the secondary transcript data; and generating revised transcript data using the correction data.

* * * * *